United States Patent
Chiu et al.

(10) Patent No.: US 7,391,465 B2
(45) Date of Patent: Jun. 24, 2008

(54) ELECTRONIC DEVICE WITH ROTATABLE IMAGE CAPTURE DEVICE

(75) Inventors: Yang-Po Chiu, Taipei Hsien (TW); An-Chung Hsieh, Taipei Hsien (TW); Deng-Zhou Zheng, Taipei Hsien (TW); Yu-Hsin Chen, Taipei Hsien (TW); Ming-Chin Yang, Taipei Hsien (TW); Ying-Fung Lau, Taipei Hsien (TW)

(73) Assignee: Wistron Corp., Taipei Hsien (TW)

( * ) Notice: Subject to any disclaimer, the term of this patent is extended or adjusted under 35 U.S.C. 154(b) by 827 days.

(21) Appl. No.: 10/865,009

(22) Filed: Jun. 10, 2004

(65) Prior Publication Data

US 2005/0185087 A1    Aug. 25, 2005

(30) Foreign Application Priority Data

Feb. 24, 2004    (TW) .............................. 93104554 A (51) Int. Cl.
*H04N 5/225* (2006.01)
(52) U.S. Cl. ........................................ 348/373; 348/376
(58) Field of Classification Search ........................ None
See application file for complete search history.

(56) References Cited

U.S. PATENT DOCUMENTS 6,141,043 A * 10/2000 Suzuki et al. ............ 348/211.2
6,177,950 B1 * 1/2001 Robb ........................ 348/14.01

* cited by examiner

Primary Examiner—Tuan Ho
Assistant Examiner—Anthony J Daniels
(74) Attorney, Agent, or Firm—Thomas, Kayden, Horstemeyer & Risley (57) ABSTRACT

An electronic device with a rotatable image capture device. The electronic device includes a body and an image capture module. The body includes a first surface, a second surface and a sleeve. The second surface is opposite the first surface. The image capture module is disposed in the body, and includes a rotary shaft and a charge-coupled device. The image capture module rotates among a first position, a second position, a third position, and a fourth position. The rotary shaft is disposed in the sleeve in a manner such that it can move between a fifth position and a sixth position. When the rotary shaft moves between the fifth position and the sixth position, the image capture module can rotate through the first position, the second position, the third position, and the fourth position.

17 Claims, 9 Drawing Sheets

ELECTRONIC DEVICE WITH ROTATABLE IMAGE CAPTURE DEVICE

BACKGROUND OF THE INVENTION

1. Field of the Invention

The invention relates to an electronic device, and in particular, to an electronic device with a protected rotatable image capture device.

2. Description of the Related Art

Electronic devices, such as mobile phones or personal digital assistants, integrating image capture function have become popular. Image capture modules can be non-rotatable or rotatable.

Non-rotatable image capture modules do not provide self-capture and device-protection functions. The image capture module is easily fouled due to friction or touch during use.

Conventional rotatable image capture modules provide the self-capture capability, but still provide no protection against environmental foulness during use.

SUMMARY OF THE INVENTION

In view of this, the invention provides an electronic device with a protected rotatable image capture device.

Accordingly, the invention provides an electronic device comprising a body and an image capture module. The body comprises a first surface, a second surface and a sleeve. The second surface is opposite to the first surface. The image capture module comprises a rotary shaft and a charge-coupled device, and is disposed in the body in a manner such that the image capture module rotates among a first position, a second position, a third position, and a fourth position. When the image capture module is in the first position, the charge-coupled device is on the first surface of the body. When the image capture module is in the second position or the fourth position, the charge-coupled device is received inside the body. When the image capture module is located in the third position, the charge-coupled device is located on the second surface of the body. The rotary shaft is disposed in the sleeve in a manner such that the rotary shaft moves between a fifth position and a sixth position. When the rotary shaft moves between the fifth position and the sixth position, the image capture module rotates through the first position, the second position, the third position, and the fourth position.

In an embodiment, the image capture module further comprises a housing, an elastic member, a printed circuit board, and a first connector. The housing is connected to the rotary shaft. The elastic member is disposed between the housing and the sleeve. The printed circuit board is connected to the rotary shaft. The charge-coupled device is disposed on the printed circuit board. The first connector is electrically connected to the printed circuit board.

The body further comprises a second connector electrically connected to the first connector. The first connector is a brush type, and the second connector is a disc. Thus, the first connector continuously abuts the second connector when the image capture module rotates through the first position, the second position, the third position, and the fourth position.

In another embodiment, the sleeve has a plurality of first protrusions and a plurality of second protrusions, and the rotary shaft has a plurality of third protrusions. When the rotary shaft is in the fifth position, the third protrusions are between the first protrusions. When the rotary shaft is in the sixth position, the third protrusions are between the second protrusions.

Moreover, the first protrusions and the second protrusions are formed inside the sleeve in a staggered manner. Each first protrusion comprises a first inclined surface facing the second protrusion. Each second protrusion comprises a second inclined surface facing the first protrusion. Each third protrusion comprises a third inclined surface and a fourth inclined surface. When the rotary shaft moves to the sixth position from the fifth position, the fourth inclined surface abuts the second inclined surface. When the rotary shaft moves to the fifth position from the sixth position, the third inclined surface abuts the first inclined surface.

Additionally, there are four first protrusions, four second protrusions, and four third protrusions. An angle intersected by an axial direction of the sleeve and the first inclined surface is forty-five degrees. An angle intersected by an axial direction of the sleeve and the second inclined surface is forty-five degrees. An angle intersected by an axial direction of the rotary shaft and the third inclined surface is forty-five degrees. An angle intersected by an axial direction of the rotary shaft and the fourth inclined surface is forty-five degrees.

It is understood that the electronic device may be a mobile phone, a notebook computer, or a personal digital assistant.

In the invention, another electronic device is provided, comprising a body and an image capture module. The body comprises a sleeve. The image capture module comprises a rotary shaft, and is disposed in the body in a manner such that the image capture module rotates between an image capture position and at least one received position. The rotary shaft is disposed in the sleeve in a manner such that the rotary shaft moves between an initial position and a compressed position. When the rotary shaft moves between the initial position and the compressed position, the image capture module rotates between the image capture position and the received position.

BRIEF DESCRIPTION OF THE DRAWINGS

The present invention can be more fully understood by reading the subsequent detailed description and examples with references made to the accompanying drawings, wherein:

FIG. 2b is a partially enlarged view of a portion b in FIG. 2a;

FIG. 2c is a top view of a second connector in FIG. 2a;

FIGS. 3a-3f are schematic views of a rotary shaft rotating relative to a sleeve in FIG. 2a;

DETAILED DESCRIPTION OF THE INVENTION

FIRST EMBODIMENT

Figure 1:
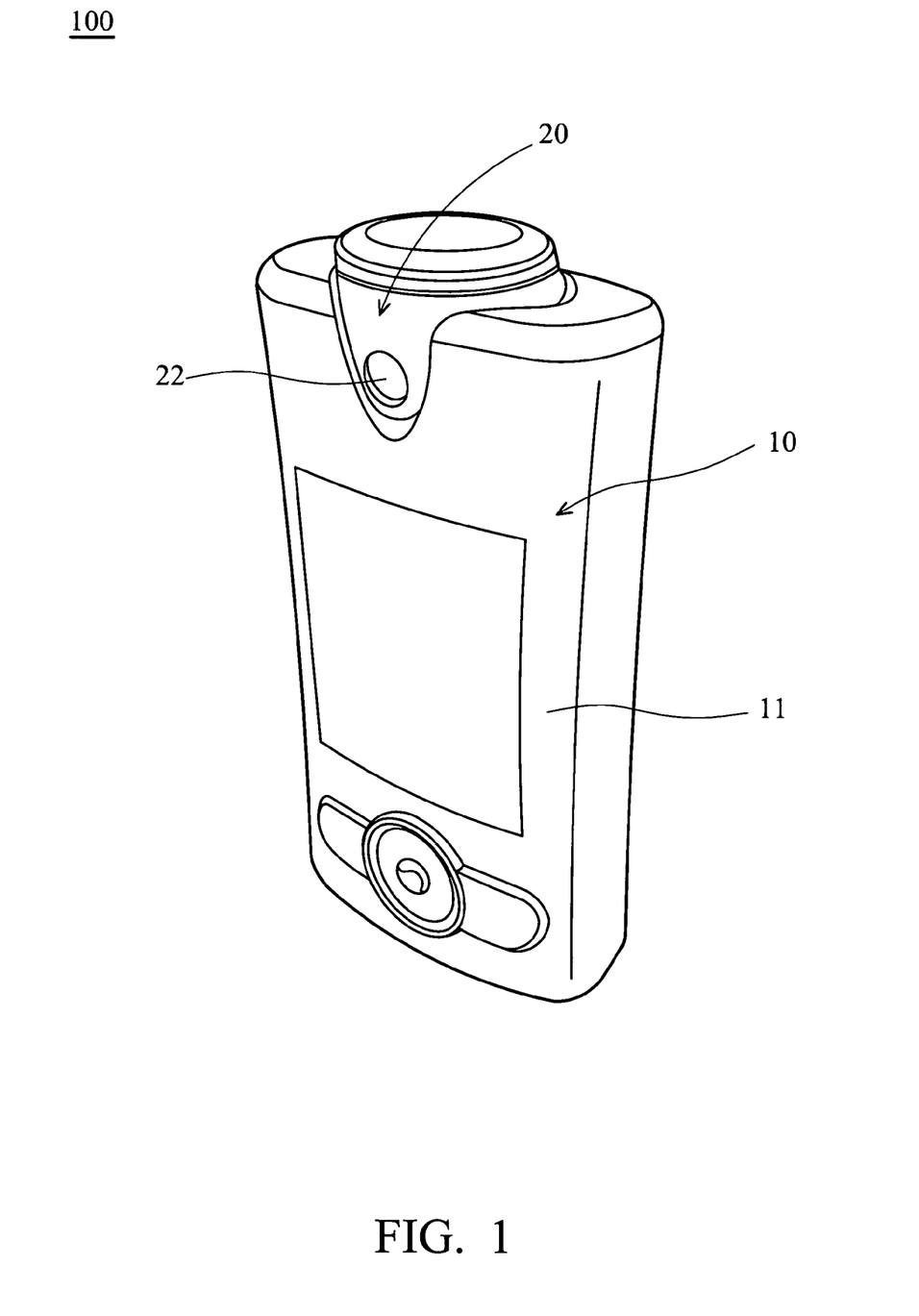
FIG. 1 is a schematic view of an electronic device as disclosed in a first embodiment of the invention.
Figure 2A:
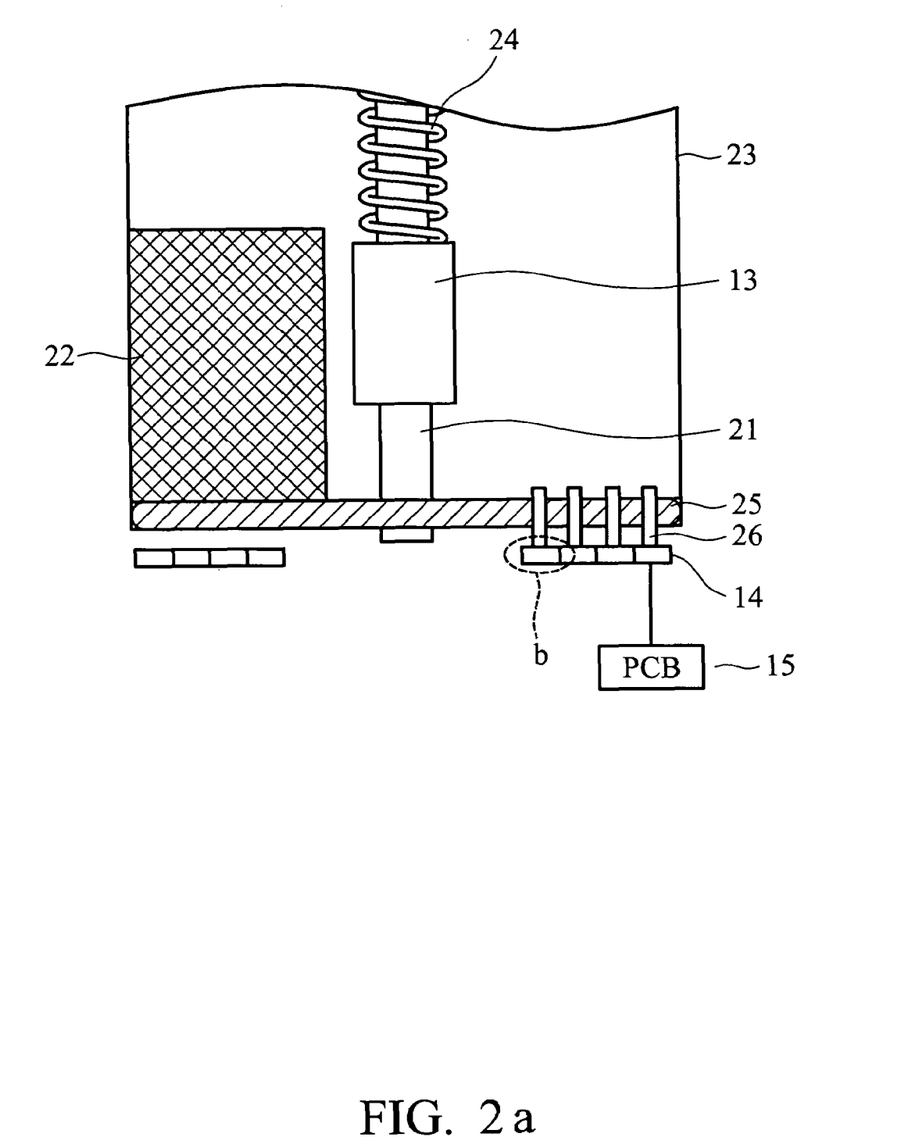
FIG. 2a is a schematic view of an image capture module in FIG. 1.
Figure 2B:
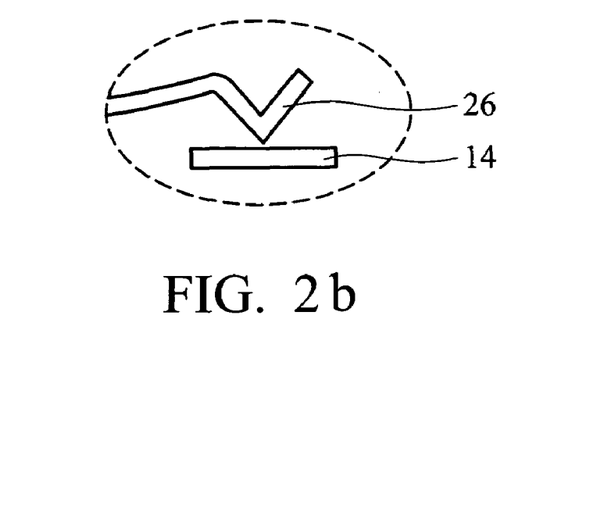
Figure 2C:
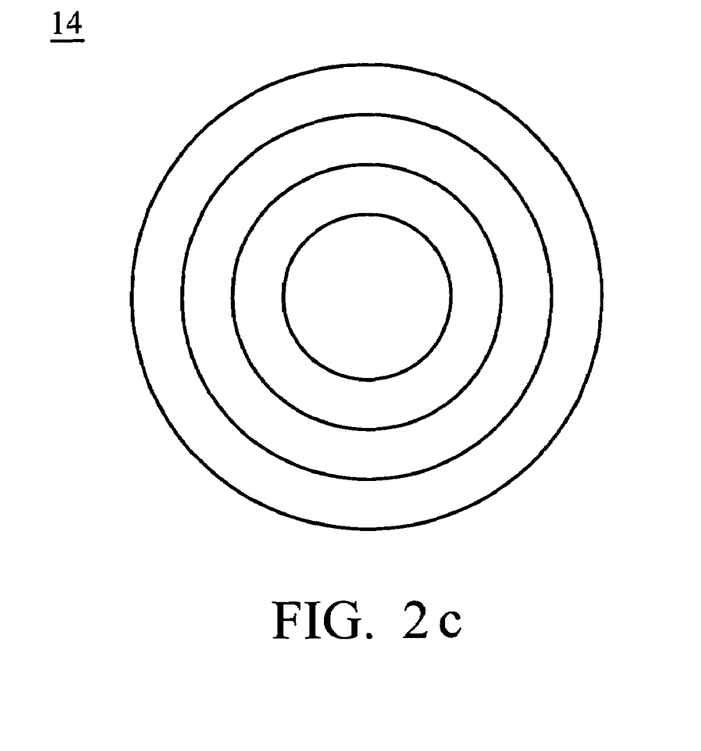

While the invention can be applied to electronic devices such as mobile phones or personal digital assistants, the following description is based on the mobile phone, for exemplary disposition. FIG. 1 is a schematic view of a mobile phone 100 with a rotatable image capture device as disclosed in a first embodiment of the invention. The mobile phone 100 comprises a body 10 and an image capture module 20. The body 10 is a basic component of the mobile phone 100, and comprises a sleeve 13, a second connector 14, and a main circuit board 15 as shown in FIG. 2a. Since other devices in the body 10 are only peripherally related to the invention, their description is omitted. Furthermore, as shown in FIG. 2c, the second connector 14 is a disc.

Figure 3A:
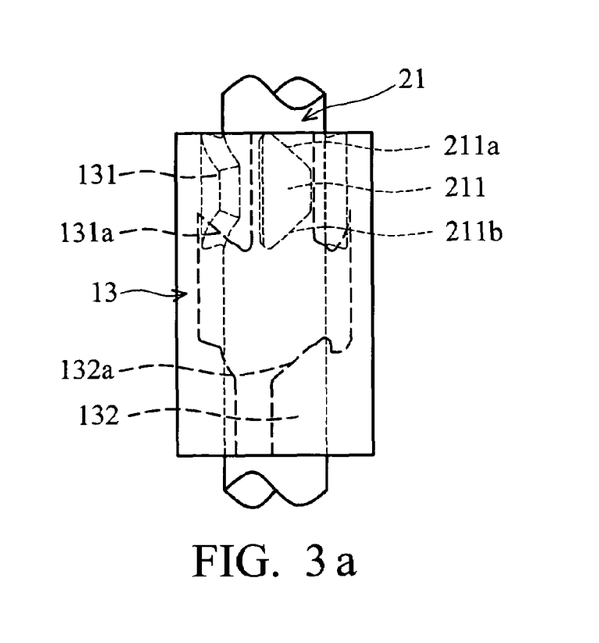

The sleeve 13 is fixed in the body 10, and, as shown in FIG. 3a, has four first protrusions 131 and four second protrusions 132 on its inner surface, although only two first protrusions 131 and two second protrusions 132 are shown in FIG. 3a. The first protrusions 131 and the second protrusions 132 are formed inside the sleeve 13 in a staggered manner so as to not overlap in an axial direction of the sleeve 13. Each first protrusion 131 comprises a first inclined surface 131a facing the second protrusion 132. Each second protrusion 132 comprises a second inclined surface 132a facing the first protrusion 131. An angle intersected by the first inclined surface 131a and the axial direction of the sleeve 13 is forty-five degrees. An angle intersected by the second inclined surface 132a and the axial direction of the sleeve 13 is also forty-five degrees.

Figure 4A:
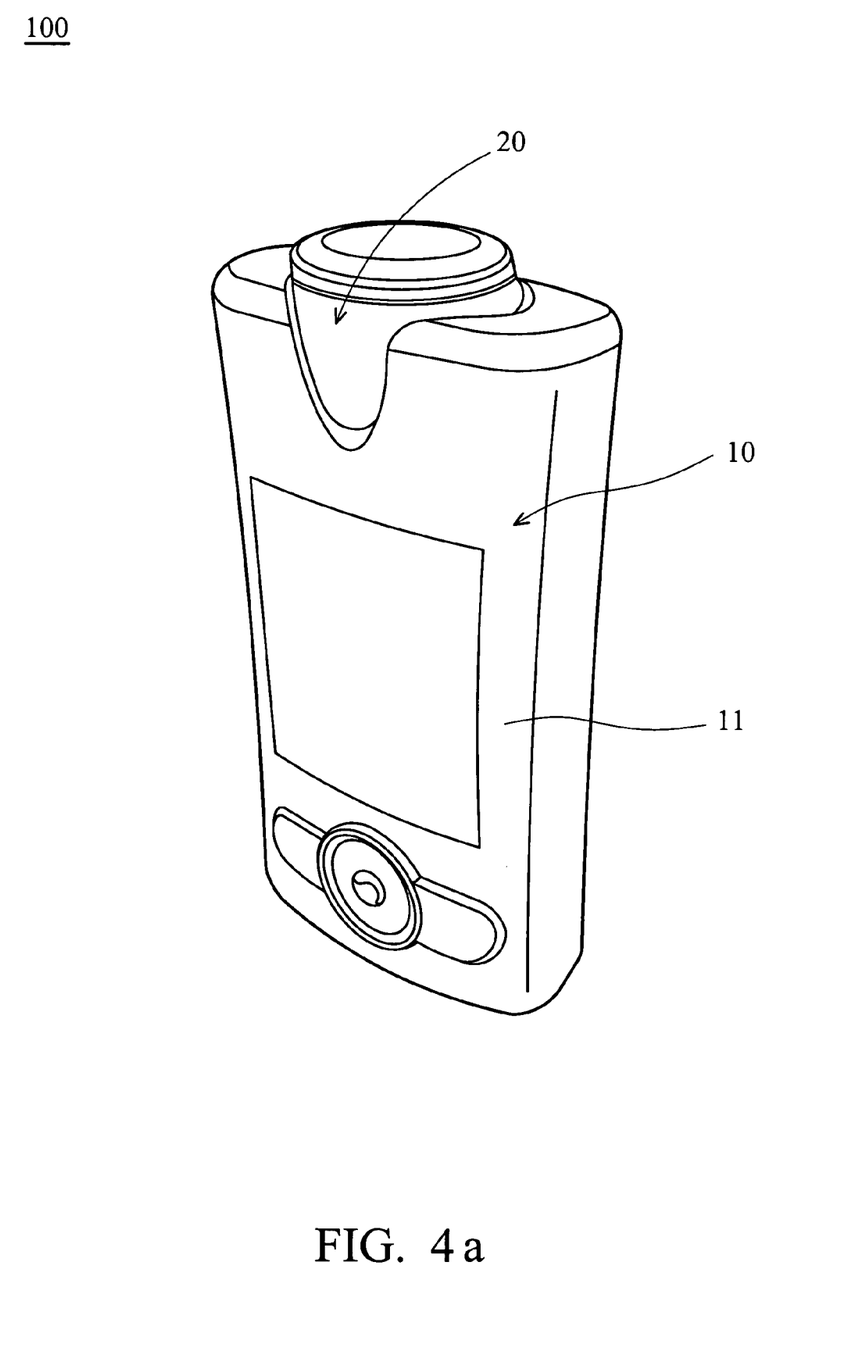
FIG. 4a is a schematic view of the electronic device in FIG. 1, wherein the image capture module is located in a second position.
Figure 4B:
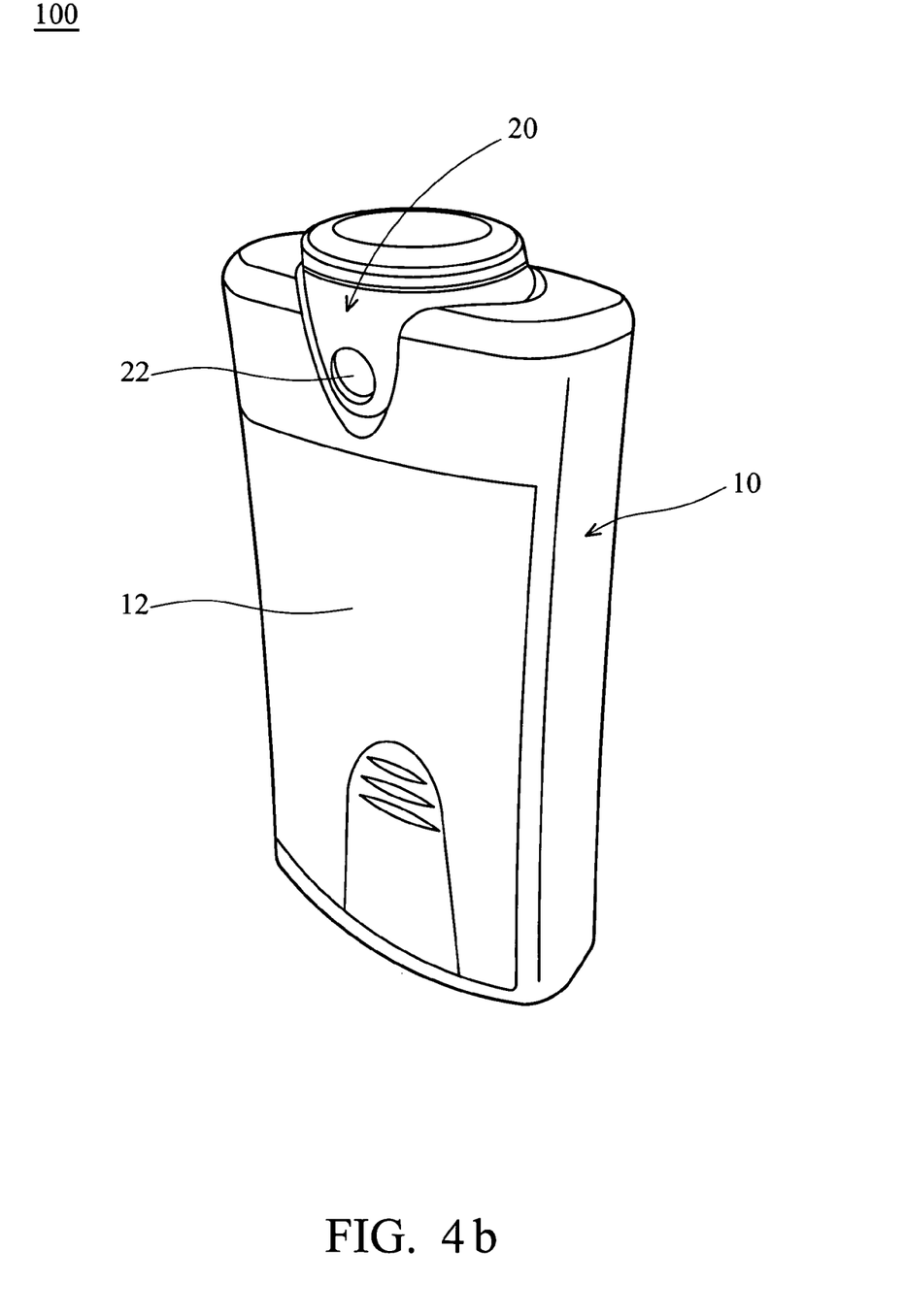
FIG. 4b is a schematic view of the electronic device in FIG. 1, wherein the image capture module is located in a third position.

The image capture module 20 is disposed in the body 10 in a manner such that the image capture module 20 rotates among a first position, a second position, a third position, and a fourth position. As shown in FIG. 2a, the image capture module 20 comprises a rotary shaft 21, a charge-coupled device 22, a housing 23, an elastic member 24, a printed circuit board 25, and a first connector 26. When the image capture module 20 is in the first position, the charge-coupled device 22 is on a first surface 11 of the body 10 for self-capture, as shown in FIG. 1. When the image capture module 20 is in the second position or the fourth position, the charge-coupled device 22 is received inside the body 10 as shown in FIG. 4a. When the image capture module 20 is in the third position, the charge-coupled device 22 is on a second surface 12 of the body 10 during capture operation, as shown in FIG. 4b. The second surface 12 is opposite to the first surface 11.

Figure 3B:
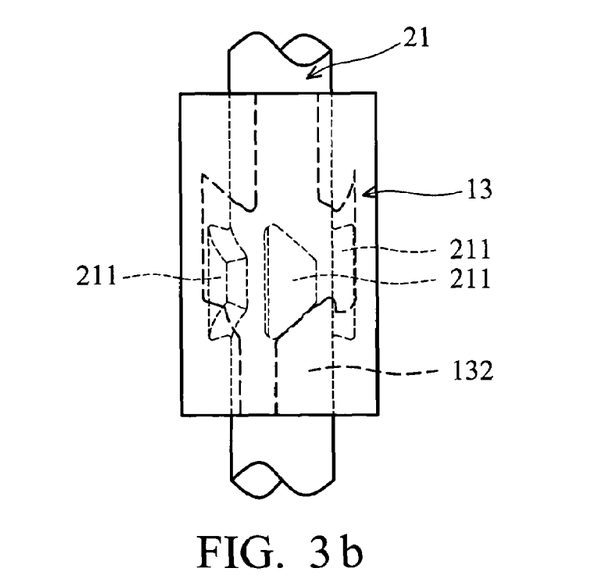
Figure 3C:
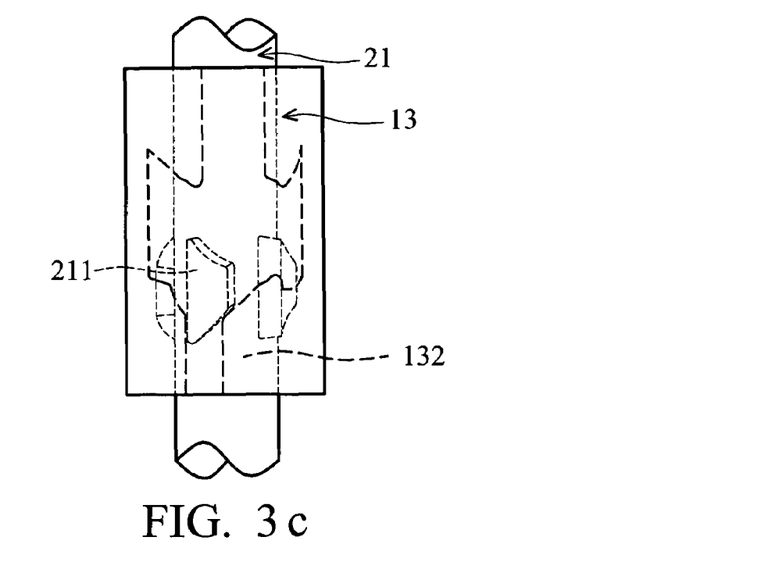
Figure 3D:
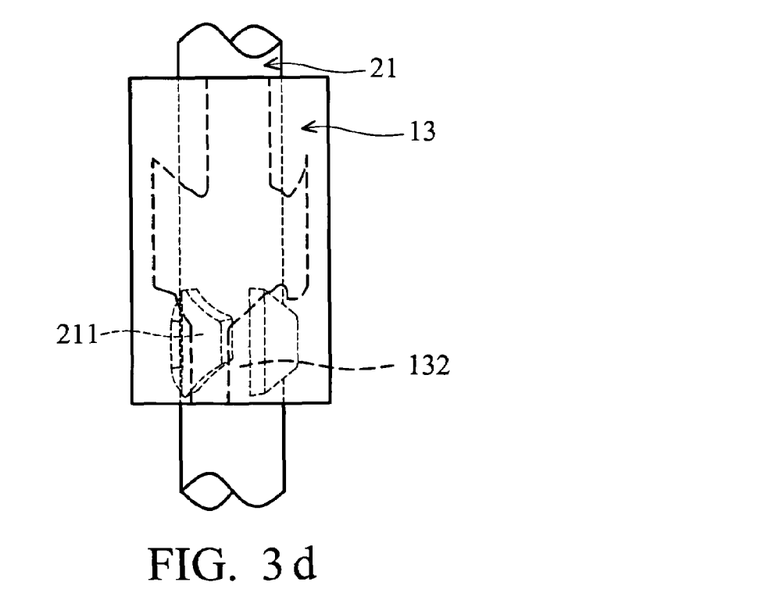

The rotary shaft 21 is disposed in the sleeve 13 of the body 10 in a manner such that the rotary shaft 21 moves between an initial position (shown in FIG. 3a and hereinafter referred as to a fifth position) and a compressed position (shown in FIG. 3d and hereinafter referred as to a sixth position). The rotary shaft 21 comprises four third protrusions 211 on its surface, although only three third protrusions 211 are shown in FIG. 3b. Each third protrusion 211 comprises a third inclined surface 211a on its top side, and a fourth inclined surface 211b on its bottom side. An angle intersected by the third inclined surface 211a and the axial direction of the rotary shaft 21 is forty-five degrees. An angle intersected by the fourth inclined surface 211b and the axial direction of the rotary shaft 21 is also forty-five degrees. Each third protrusion 211 and each first protrusion 131 (or each second protrusion 132) is separated by ninety degrees in a circumferential orientation of the rotary shaft 21.

The charge-coupled device 22 is electrically connected to the printed circuit board 25, enabling function of the image capture module 20. When the image capture module 20 is in the first position, the charge-coupled device 22 is on the first surface 11 of the body 10 for self-capture, as shown in FIG. 1. When the image capture module 20 is in the second position or the fourth position, the charge-coupled device 22 is received inside the body 10 as shown in FIG. 4a. When the image capture module 20 is in the third position, the charge-coupled device 22 is on the second surface 12 of the body 10 during capture operation, as shown in FIG. 4b.

The housing 23 is connected to the rotary shaft 21, moving with the rotary shaft 21. The elastic member 24 is a compression spring, disposed between the housing 23 and the sleeve 13 of the body 10 to return the rotary shaft 21 to the fifth position via the housing 23. The printed circuit board 25 is connected to the rotary shaft 21 to be moved along with the rotary shaft 21, and is electrically connected to the charge-coupled device 22 to process signals from the charge-coupled device 22. The first connector 26 is a brush type as shown in FIG. 2b electrically connected to the printed circuit board 25. The first connector 26 is also electrically connected to the second connector 14 of the body 10. When the image capture module 20 rotates through the first position, the second position, the third position, and the fourth position, the first connector 26 continuously abuts the second connector 14.

While in this description, the first connector 26 is a brush type and the second connector 14 is a disc, the invention is not limited thereto as long as contact is maintained throughout during the rotation of the image capture module 20.

Figure 3E:
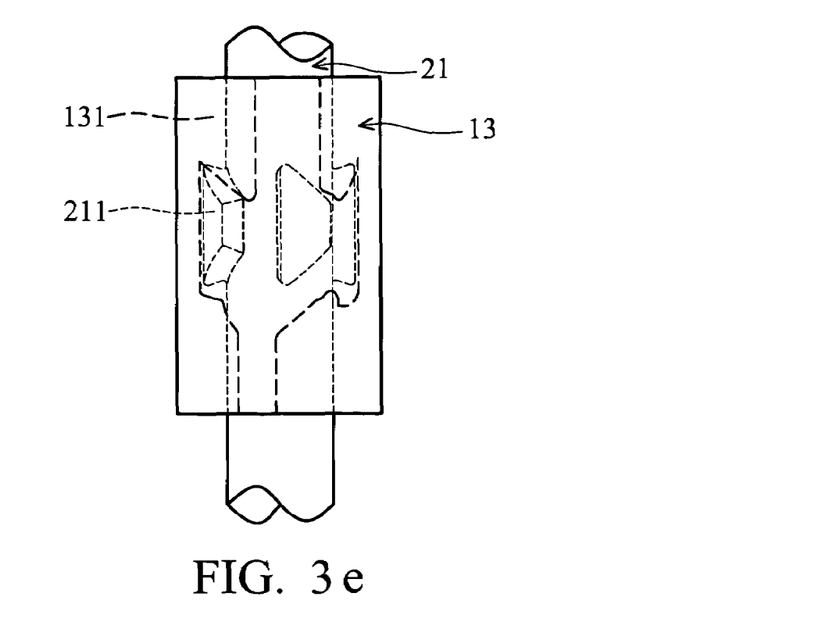
Figure 3F:
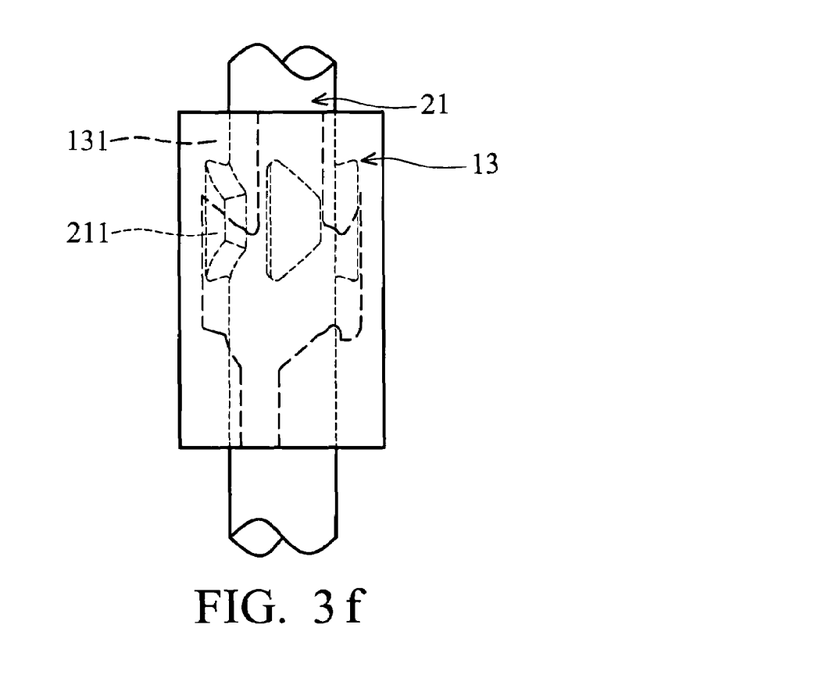

In a normal situation, the rotary shaft 21 of the image capture module 20 is in the fifth position as shown in FIG. 3a, and each third protrusion 211 thereof is between the first protrusions 131 of the sleeve 13. To rotate the image capture module 20 to another position from one position, the image capture module 20 is moved downward so that the rotary shaft 21 moves toward the sixth position from the fifth position. At this time, the fourth inclined surfaces 211b of the third protrusions 211 abut the second inclined surfaces 132a of the second protrusions 132 of the sleeve 13 as shown in FIG. 3b. The third protrusions 211 then move to the sixth position as shown in FIGS. 3c-3d, between the second protrusions 132. After removing external force, the rotary shaft 21 then moves toward the fifth position from the sixth position. At this time, the third inclined surfaces 211a of the third protrusions 211 abut the first inclined surfaces 131a of the first protrusions 131 as shown in FIGS. 3e-3f. The third protrusions 211 then return to the fifth position. Thus, when the rotary shaft 21 moves between the fifth position and the sixth position, the image capture module 20 can rotate through the first position, the second position, the third position, and the fourth position.

According to this embodiment, when the image capture module 20 is pressed downward, it can rotate a predetermined distance clockwise. The rotating distance depends on the arrangement of the protrusions. For example, in this embodiment, each third protrusion 211 and each first protrusion 131 (or each second protrusion 132) are separated by ninety degrees in the circumferential orientation of the rotary shaft 21. Thus, every time the image capture module 20 is pressed downward, it can rotate ninety degrees. As a result, the image capture module can be rotated without touch and getting dirty.

Additionally, since there are four first protrusions, four second protrusions, and four third protrusion, the image capture module can be rotated in four steps, although the invention is not limited thereto. For example, the number of each of the first, second, third protrusions may be increased or decreased based on needs to change the rotation steps of the image capture module. For example, in a mobile phone without the self-image capture function, the number of each of the first, second, third protrusions can be three such that the image capture module can rotate among an image capture position and two received positions. The detail description thereof is in the following embodiment.

Moreover, while the description of the electronic device is based on a mobile phone, the invention is not limited thereto.

For example, the electronic device may be a notebook computer or a personal digital assistant.

Furthermore, while the housing is rotated along with the rotary shaft in this embodiment, the invention is not limited thereto. The housing and the rotary shaft may be independent from each other. Also, while the image capture module is rotated by equal angles (90, 90, 90, and 90) in this embodiment, the invention is not limited thereto. For example, the image capture module may be rotated by non-equal angles, such as 80, 100, 80, and 100.

SECOND EMBODIMENT

Figure 5A:
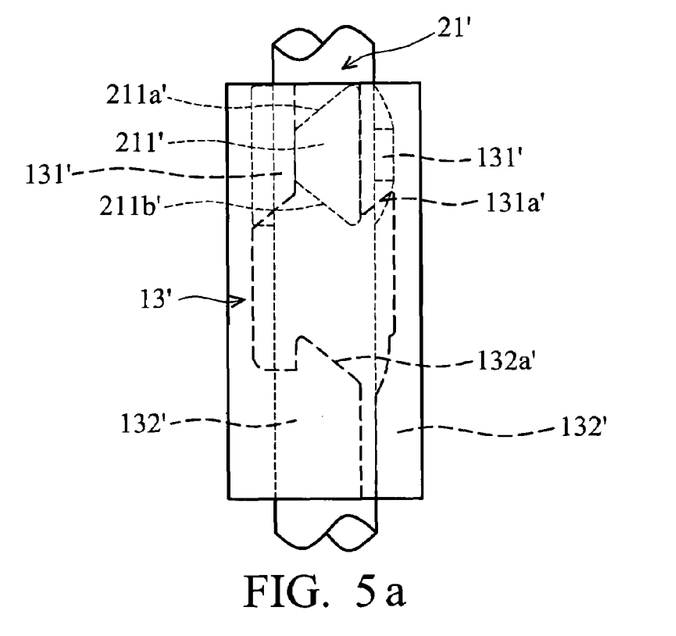
FIGS. 5a-5b are schematic views of an electronic device as disclosed in a second embodiment of the invention.
Figure 5B:
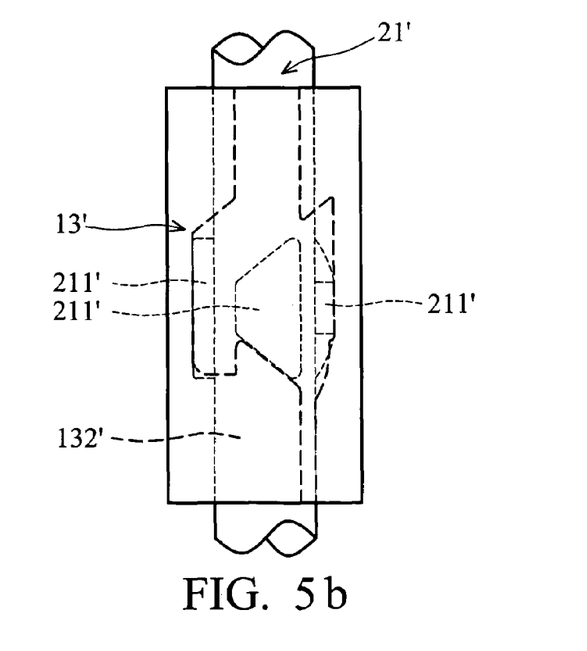

FIGS. 5*a*-5*b* are schematic views of a mobile phone with a rotatable image capture device as disclosed in a second embodiment of the invention. The mobile phone comprises a sleeve 13' and a rotary shaft 21'. It is noted that the components in this embodiment same as those in the first embodiment are presented by the same references, and their description is omitted.

The sleeve 13' has three first protrusions 131' and three second protrusions 132, although it is noted only two first protrusions 131' and two second protrusions 132' are shown in FIG. 5*a*. An angle intersected by a first inclined surface 131*a*' of the first protrusion 131' and an axial direction of the sleeve 13' is forty-five degrees. An angle intersected by a second inclined surface 132*a*' of the second protrusion 132' and the axial direction of the sleeve 13' is also forty-five degrees. The rotary shaft 21' has three third protrusions 211'. An angle intersected by a third inclined surface 211*a*' of the third protrusion 211' and an axial direction of the rotary shaft 21' is forty-five degrees. An angle intersected by a fourth inclined surface 211*b*' of the third protrusion 211' and the axial direction of the rotary shaft 21' is also forty-five degrees. According to this embodiment, when the image capture module 20 is pressed downward, it can rotate a predetermined distance counterclockwise. It is noted that, since each inclined surface of this embodiment is opposite to corresponding inclined surfaces of the first embodiment, the image capture module rotates counterclockwise.

Specifically, the image capture module is disposed in the body in a manner such that the image capture module rotates between a first received position, an image capture position, and a second received position. When the image capture module is in the first received position or the second received position, the charge-coupled device is inside the body. When the image capture module is in the image capture position, the charge-coupled device is on the second surface of the body during capture operation. After the image capture module in the first received position is pushed downward, it rotates ninety degrees counterclockwise to the image capture position. If the image capture module, in the image capture position, is pushed downward, it is rotated ninety degrees counterclockwise to the second received position. If the image capture module in the second received position is pushed downward, it is rotated 180 degrees counterclockwise to the first received position again.

It is noted that the first received position of this embodiment corresponds to the second position of the first embodiment, the image capture position of this embodiment corresponds to the third position of the first embodiment, and the second received position of this embodiment corresponds to the fourth position of the first embodiment.

It is understood that every time the image capture module is rotated, it may rotate in different angles. For example, the image capture module may rotate 80, 100, 180 degrees sequentially to complete the rotation each time.

As stated above, the number of each of the first, second, third protrusions may be increased or decreased. For example, the number of each of the first, second, third protrusions may be five, with an inclined angle of the inclined surface of each of the first, second, third protrusions of forty-five degrees. Thus, every time the image capture module is pushed downward, it rotates approximately 72 degrees. Since the rotating manner is the same as in the previous embodiment, description thereof is omitted.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device with a rotatable image capture device comprising:

a body comprising a first surface, a second surface and a sleeve, wherein the second surface is opposite to the first surface; and an image capture module, comprising a rotary shaft and a charge-coupled device, disposed in the body in a manner such that the image capture module rotates among a first position, a second position, a third position, and a fourth position, wherein the charge-coupled device is on the first surface of the body when the image capture module is in the first position, the charge-coupled device is received inside the body when the image capture module is in the second position or the fourth position, the charge-coupled device is on the second surface of the body when the image capture module is in the third position, the rotary shaft is disposed in the sleeve in a manner such that the rotary shaft moves between a fifth position and a sixth position, the image capture module rotates among the first position, the second position, the third position, and the fourth position when the rotary shaft moves between the fifth position and the sixth position;

wherein the sleeve is formed with a plurality of first protrusions and a plurality of second protrusions, the rotary shaft is formed with a plurality of third protrusions, the third protrusions are between the first protrusions when the rotary shaft is in the fifth position, the third protrusions are between the second protrusions when the rotary shaft is in the sixth position.

2. The electronic device as claimed in claim 1, wherein the image capture module further comprises:

a housing connected to the rotary shaft;

an elastic member disposed between the housing and the sleeve;

a printed circuit board connected to the rotary shaft, wherein the charge-coupled device is disposed on the printed circuit board; and a first connector electrically connected to the printed circuit board.

3. The electronic device as claimed in claim 2, wherein the body further comprises a second connector electrically connected to the first connector.

4. The electronic device as claimed in claim 3, wherein the first connector is a brush and the second connector is a disc, such that contact therebetween is maintained continuously when the image capture module rotates among the first position, the second position, the third position, and the fourth position.

5. The electronic device as claimed in claim 1, wherein the first protrusions and the second protrusions are formed inside the sleeve in a staggered manner.

6. The electronic device as claimed in claim 1, wherein each first protrusion comprises a first inclined surface facing the second protrusion, each second protrusion comprises a second inclined surface facing the first protrusion, each third protrusion comprises a third inclined surface and a fourth inclined surface, the fourth inclined surface abuts the second inclined surface when the rotary shaft moves to the sixth position from the fifth position, the third inclined surface abuts the first inclined surface when the rotary shaft moves to the fifth position from the sixth position.

7. The electronic device as claimed in claim 6, wherein the number of the first protrusions is four, the number of the second protrusions is four, the number of the third protrusions is four, an angle intersected by an axial direction of the sleeve and the first inclined surface is forty-five degrees, an angle intersected by an axial direction of the sleeve and the second inclined surface is forty-five degrees, an angle intersected by an axial direction of the rotary shaft and the third inclined surface is forty-five degrees, an angle intersected by an axial direction of the rotary shaft and the fourth inclined surface is forty-five degrees.

8. The electronic device as claimed in claim 1, wherein the electronic device is a mobile phone, a notebook computer, or a personal digital assistant.

9. An electronic device with a rotatable image capture device comprising:
a body comprising a sleeve; and
an image capture module, comprising a rotary shaft, disposed in the body in a manner such that the image capture module rotates between an image capture position and at least one received position, wherein the rotary shaft is disposed in the sleeve in a manner such that the rotary shaft moves between an initial position and a compressed position, and the image capture module rotates between the image capture position and the at least one received position when the rotary shaft moves between the initial position and the compressed position;
wherein the sleeve is formed with a plurality of first protrusions and a plurality of second protrusions, the rotary shaft is formed with a plurality of third protrusions, the third protrusions are between the first protrusions when the rotary shaft is in the initial position, and the third protrusions are between the second protrusions when the rotary shaft is in the compressed position.

10. The electronic device as claimed in claim 9, wherein the image capture module further comprises:

a housing connected to the rotary shaft;
an elastic member disposed between the housing and the sleeve;
a printed circuit board connected to the rotary shaft;
a charge-coupled device disposed on the printed circuit board; and
a first connector electrically connected to the printed circuit board.

11. The electronic device as claimed in claim 10, wherein the body further comprises a second connector electrically connected to the first connector.

12. The electronic device as claimed in claim 11, wherein the first connector is a brush and the second connector is a disc, such that contact therebetween is maintained continuously when the image capture module rotates between the image capture position and the at least one received position.

13. The electronic device as claimed in claim 10, wherein the charge-coupled device is exposed from the body when the image capture module is located in the image capture position, and the charge-coupled device is received in the body when the image capture module is located in the at least one received position.

14. The electronic device as claimed in claim 9, wherein the first protrusions and the second protrusions are formed inside the sleeve in a staggered manner.

15. The electronic device as claimed in claim 9, wherein each first protrusion comprises a first inclined surface facing the second protrusion, each second protrusion comprises a second inclined surface facing the first protrusion, each third protrusion comprises a third inclined surface and a fourth inclined surface, the fourth inclined surface abuts the second inclined surface when the rotary shaft moves to the compressed position from the initial position, the third inclined surface abuts the first inclined surface when the rotary shaft moves to the initial position from the compressed position.

16. The electronic device as claimed in claim 15, wherein the number of the first protrusions is four, the number of the second protrusions is four, the number of the third protrusions is four, an angle intersected by an axial direction of the sleeve and the first inclined surface is forty-five degrees, an angle intersected by an axial direction of the sleeve and the second inclined surface is forty-five degrees, an angle intersected by an axial direction of the rotary shaft and the third inclined surface is forty-five degrees, an angle intersected by an axial direction of the rotary shaft and the fourth inclined surface is forty-five degrees.

17. The electronic device as claimed in claim 9, wherein the electronic device is a mobile phone, a notebook computer, or a personal digital assistant.

* * * * *